United States Patent Office 3,253,941
Patented May 31, 1966

3,253,941
AMINOALKYL POLYMER FLOOR POLISHING COMPOSITION AND REMOVER
William M. Finn, Framingham Center, and Francis L. McCarthy, Wollaston, Mass., assignors to A. E. Staley Manufacturing Company, Decatur, Ill., a corporation of Delaware
No Drawing. Filed Mar. 12, 1962, Ser. No. 179,239
9 Claims. (Cl. 117—6)

This invention relates to a new floor polish. More particularly this invention relates to a new floor polish, which is neither dulled nor removed by soap and water, but which can be readily removed from the flooring. This invention is also concerned with a method for treating and preserving flooring materials.

The ideal floor polish, which has never been attained until now, is a well-balanced composition having the following properties; spreads easily; levels well; dries rapidly; has high gloss; has good clarity; has little or no tendency to discolor; has resistance to spilled household liquids; has resistance to water spotting; has resistance to scuffing and scratching; has a long life; can be washed with soap (including detergents) and water without being removed or dulled; can be removed easily, when desired, without any deleterious effect on the flooring; and can be recoated with a second layer of polish without removal of the first layer. In recent years, floor polish formulators have turned to floor polishes based on polymers of styrene and/or acrylates in an attempt to find products having a maximum number of these desirable properties. While these floor polishes have met with considerable commercial success, none of them has had all of the above properties. Regardless of what other properties the formulator was willing to sacrifice, it has always been necessary to sacrifice either soap and water resistance or removeability. To the best of our knowledge, until now, commercially available floor polishes, resistant to dulling and removal by soap and water, either could not be removed uniformly from the floor or required extensive abrading action that had deleterious effects on linoleum, on asphalt, rubber, vinyl and other tile and on other so-called "hard-surface" flooring. For example, kerosene based solvents tend to remove the pigmentation from the surface of the flooring in such a manner that a subsequently applied coat of polish has a dull appearance. On the other hand, strenuous scouring leads to the abrasion of the flooring.

The object of this invention is to provide a floor polish that forms a protective coating resistant to washing with soap and water, easily, completely and uniformly removable with simple, safe materials that have no deleterious effects on the flooring. A further object of this invention is to provide a floor polish having all of the above-described qualities to a marked degree. Another object of this invention is to provide a composition for removing said protective coating without deleterious effect on the flooring material to which it is applied. Still another object is to provide a method for protecting resilient flooring of the type described.

In one aspect, this invention is a floor polish comprising an addition emulsion polymer of an ethylenically unsaturated amino alkyl compound having an average particle size of from about 0.005 to 0.1 micron.

In a second, somewhat more specific aspect, this invention is a floor polish comprising an addition emulsion polymer of an amino alkyl acrylate having an average particle size of from about 0.005 to 0.1 micron.

In another aspect, this invention is a floor polish remover having a pH of from about 6 to 7 in an aqueous medium and comprising a water-soluble organic polar solvent and a water-soluble salt of a weak acid.

In still another aspect, this invention is a method of protecting flooring by applying a floor polish of the type described, removing the floor polish after a period of wear by applying the floor polish remover and applying the floor polish again.

The amino alkyl polymers used in practicing this invention are emulsion polymerization products having an average particle size of about 0.005 to 0.1 micron and comprised of at least three essentially different types of monomers. The first type (monomer A) which can comprise from about 4 to 20 weight percent of the comonomers is an ethylenically unsaturated amino alkyl monomer, ether, ester or amide, having the formula

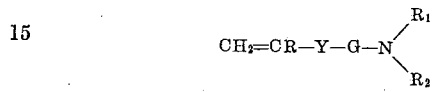

wherein R is hydrogen or methyl; Y is

G is a straight-chain or branched-chain alkylene or hydroxy-alkylene group having from 2–10 carbon atoms of which at least two are connected in a chain between the N atom and Y group of the formula; $R_1$ and $R_2$ are (1) independently alkyl groups of 1 to 8 carbon atoms, or (2) a single group taken together with N selected from the morpholino residue, the pyrrolidino residue, the piperidino residue, and an N-alkyl piperazino residue whose alkyl group has from 1–18 carbon atoms such as methyl, ethyl and stearyl or (3) $R_1$ is an alkyl group of from 1 to 8 carbon atoms and $R_2$ is hydrogen; and $R_3$ is an alkyl group of from 1 to 4 carbon atoms. The primary function of monomer A is to give the copolymers based on these monomers and the floor polishes containing these copolymers the ability to be readily removed from the flooring. When monomer A comprises less than about 4 weight percent of the copolymer, the polymer and the applied floor polish based on same cannot be removed from the flooring without the use of materials which have a deleterious effect on the flooring. On the other hand, when monomer A comprises more than about 20 weight percent, the copolymer and applied polish based on the copolymer are too sensitive to household acids, such as vinegar. It is to be understood that if a mixture of a copolymer having more than 20 weight percent monomer A and a copolymer having less than 20 (0 to 19) weight percent monomer A has an average A monomer content of from about 4 to 20 weight percent it is within the scope of this invention.

In addition to the removability characteristics, which the above monomers impart to the applied floor polish, the (A) monomers also contribute to various other properties necessary in a floor polish. For example, the amino alkyl methacrylates and the N-amino alkyl methacrylamides are hard monomers which function in the same manner as other hard monomers as explained below. On the other hand, the amino alkyl acrylates and N-amino alkyl acrylamides are soft monomers and function in the same manner as other soft monomers although not quite as effectively as unsubstituted alkyl acrylates.

Dimethylaminoethyl methacrylate, diethylaminoethyl acrylate, diethylaminoethyl methacrylate and tert-butylaminoethyl methacrylate are preferred as monomer A, because they give the best balance of resistance to washing with soap and ease of removal when compounded into polish formulations. However, various other monomers, such as diethylaminoethyl vinyl ether, 8-(dimethylamino)-octyl vinyl ether, 2-morpholinoethyl vinyl ether, 2-pyrrolidinoethyl acrylate, 3-(dimethylamino) - 2 - hydroxypropyl acrylate, N-dimethylaminoethyl acrylamide, N-diethylaminoethyl methacrylamide, etc. can be used.

The monomer of the second type (monomer B) and the monomer of the third type (monomer C) are ethylenically unsaturated compounds capable of copolymerizing with those of the first type through a vinylidene

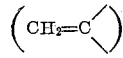

group. Of the two, monomers B and C, monomer C by itself forms soft polymers and monomer B by itself forms hard polymers and tends to impart freedom from tack to the polishes formed from the copolymer. The terms "hard" and "soft" are used herein in referring to polymers formed from the monomer alone, in the way that is common in this technology. (See Riddle, "Acrylic Esters," Reinhold Pub. 1954, pages 58 et seq.; also Patent number 2,795,564.) Generally, this refers to the "brittle-point" of the polymer, i.e., the temperature at which the polymer breaks on flexing. The hard monomers useful in this invention have brittle points in excess of 20° C.

The hard monomers (monomer B and hard A monomers) comprise from about 40 to 80 weight percent of the comonomers in the copolymer. When the copolymer contains more than 80 weight percent of hard monomers (75 weight percent when monomer A is a soft monomer), the final polish composition does not have the proper film forming characteristics; it does not form a continuous, clear, craze-free layer, which can withstand normal wear, impact and flexure without cracking, flaking and scratching objectionably. On the other hand, when the copolymer contains less than 40 percent by weight hard monomer, the applied polish lacks the abrasion resistance necessary for a good floor polish. Furthermore, if too soft, dirt becomes imbedded easily in the polish, thereby shortening the life of the coating. Generally, the best results have been attained when the B monomer comprises from about 60 to 72 weight percent of the comonomers, a hard A monomer (particularly dimethylaminoethyl methacrylate) comprises from 5 to 12 weight percent of the comonomers and the total of B monomer plus hard A monomer comprises from 70 to 77 weight percent of the comonomers, the balance of the 100 percent being monomer C.

Styrene, vinyl toluene, acrylonitrile and methyl methacrylate are the preferred B type monomers because of either their low cost and/or the ease with which copolymers of these monomers can be formed with the preferred amino alkyl acrylate type A monomers and/or the final characteristics imparted to the copolymers and applied polish. However, each of these monomers has its drawbacks. For example, copolymers based on acrylonitrile have a tendency to yellow the applied polish, copolymers based on methyl methacrylate are relatively more expensive than those based solely on acrylonitrile or the monovinyl aromatics, and polymers based on the monovinyl aromatics require more stringent control of the polymerization conditions during their formation. Because of these various considerations, we prefer to use emulsion copolymers containing both methyl methacrylate and a monovinyl aromatic. However, any other hard monomer, such as methacrylonitrile, ethyl methacrylate, etc., can be employed.

As can readily be seen from the preceding, the soft monomers (monomer C and soft monomer A) comprise from about 20 to 60 weight percent of the comonomers (25 to 60 weight percent when all of the A monomer is soft). While monomer C can comprise from about 5 to 60 weight percent of the comonomers, the best results have been attained when monomer C comprises from about 15 to 30 weight percent of the comonomers irrespective of whether monomer A is hard or soft. When the A monomer is soft, the floor polish has its best properties when monomer A and monomer C total 28 to 35% of the comonomers. Acrylic acid esters of primary and secondary alcohols having from 1 to 8 carbon atoms, such as ethyl acrylate and 2-ethylhexyl acrylate, and methacrylic acid esters of primary and secondary alcohols having from 4 to 12 carbon atoms, such as butyl methacrylate and dodecyl methacrylate are suitable soft C monomers. Ethyl acrylate and 2-ethylhexyl acrylate are the preferred C monomers. We have found that when the concentration of the hard monomer approaches about 70–75 weight percent of the copolymer, it is advisable that at least part of the content of monomer C be a longer chain alkyl ester, particularly 2-ethylhexyl acrylate, to reduce the rigidity and brittleness of the polymer.

The table following summarizes the permissible and preferred weight percents of the copolymerizable monomers, the total being 100%:

|  | Preferred | Permissible |
|---|---|---|
| Monomer A | 5–12 | 4–20 |
| Monomer B | 60–72 | 36–75 |
| Monomer C | 15–30 | 5–60 |
| Hard A+B [1] | 70–77 | 40–80 |
| Soft A+C [2] | 28–35 | 25–60 |

[1] When A is a hard monomer the total concentration of hard monomer can be from 40 to 80 weight percent of the comonomer and is preferably from 70 to 77 weight percent. Accordingly, the total concentration of C monomer must be between 20 to 60 weight percent.
[2] When A is a soft monomer the total concentration of soft monomer can be from 25 to 60 weight percent of the comonomer and is preferably from 28 to 35 weight percent. Accordingly, the total concentration of B monomer must be between 40 to 75 weight percent.

As pointed out above, the aminoalkyl polymers of this invention have an average particle size of from about 0.005 to 0.1 micron. Other things being equal, the smaller the particle size of the copolymer, the greater the luster of the floor polish. To the best of our knowledge, the particle size (0.005 to 0.1 micron) cannot be attained except by carefully controlled emulsion polymerization. The emulsion polymerization technique does not insure the necessary particle size, absent the careful control.

The surface active agents which have been found useful for emulsification of the copolymer may be chosen from a wide variety of cationic and non-ionic surface active agents and a limited number of anionics. Two or more surface active agents are frequently used of one or more types, and it is preferred to use a combination. The preferred non-ionic surface active agents are composed of a hydrophobic hydrocarbon portion and a hydrophilic portion. The latter is a chain of 2 to 120 oxyethylene units while the former has an alkyl group of 4 to 18 carbon atoms which may be linked to the oxyethylene chain through a phenoxy group. The anionic surface active agents normally have a hydrophilic anion and a hydrophobic cation. An example of an acceptable anionic surface active agent is the tetrasodium salt of N-(1,2-dicarboxyethyl) N-octadecyl sulfosuccinamate (Aerosol 22). Suitable cationic surface active agents are N-cetyl-N-ethyl morpholinium ethosulfate (Atlas G–263) and the alkyl ether of dimethylbenzylammonium chloride (Siposan 6XTF). In large measure, the selection of surface active agent is empirical because it must be compatible not only with the dried copolymer but also with the floor polish ingredients with which the emulsion is later compounded. The principles guiding the selection of a surface active agent (or agents) for the present copolymer emulsions are the same as for prior polymer emulsions designed for floor polishes.

The particle size of the emulsion copolymers of this invention is dependent to a great extent on the concentration of the surface active agents forming the emulsion and the concentration of the monomers to be polymerized. Other things being equal, the higher the concentration of surface active agents in the emulsion polymerization system, the smaller the particle size of the emulsion copolymer. In order to attain the desired particle size, it is desirable that the concentration of dispersing agents is at least 3% by weight (preferably 10%) of the monomer weight to be polymerized. However, as the concentration of surface active agents increases above about 10–12% of the total monomer weight, the water-sensitivity and alkali-sensitivity of the dried film of floor polish increases rapidly. We have found that while the water-sensitivity and alkali-sensitivity of the aminoalkyl copolymers and floor polishes based on these copolymers is dependent upon the final concentration of amino alkyl copolymer and surface active agents, the particle size of the copolymer is primarily dependent upon the initial concentration of the polymerizable monomers and surface active agents. Apparently, almost all of the copolymer particles are formed at the beginning of the polymerization and accordingly, the final concentration of the surface active agents can be considerably lower than that which is most desirable when the polymerization is initiated. The desired particle size of our aminoalkyl copolymers is attained without the copolymer having undue alkali or water-sensitivity by initiating the aqueous emulsion polymerization of from about 5 to 60 weight percent of the monomers to be polymerized wherein the dispersing agents total at least 0.03 and preferably in excess of 0.10 part by weight per part of monomer in the aqueous emulsion and from about 0.01 to 0.12 part by weight per total part of monomer to be polymerized. After the reaction becomes exothermic, the remaining monomer is added to the emulsion and polymerized.

As polymerization catalyst, there may be used one or more free-radical catalysts which are soluble in the monomer phase or may have at least some solubility in aqueous solutions of the emulsifier. Among the useful catalysts for the present type of polymerization are hydrogen peroxide and organic free radical catalysts, such as organic peroxides and hydroperoxides. These include benzoyl peroxide, tert-butyl hydroperoxide, diisopropyl benzene hydroperoxide, cumene hydroperoxide, caproyl peroxide, methyl ethyl ketone peroxide, etc. Other organic free-radical catalysts are also useful, such as azo-diisobutyronitrile and other aliphatic azo compounds of the type having an acyclic azo group and an aliphatic carbon atom on each nitrogen, at least one of which is tertiary. In part, the particular combination of monomers governs the selection of the catalyst since some monomers respond better to one variety than they do to another.

The amount of catalyst required is about proportional to the concentration of the monomers used. The usual range is 0.01% to 3% of catalyst based on weight of monomers.

Frequently a promoter for the catalyst (sometimes called an "accelerator" or "adjuvant") is used to hasten the reaction at a sufficiently low temperature to avoid coagulation. The promoter may be a reducing agent and together with the peroxidic catalyst is frequently referred to as a "redox system." Many examples of such systems are known, and the promoters include ascorbic acid and soluble sulfites, hydrosulfites, sulfoxalates, thiosulfates and bisulfites. Particular promoters are exemplified by sodium hydrosulfite, sodium metabisulfite, zinc or sodium formaldehyde sulfoxalate and calcium bisulfite. Polyvalent metal ions are also used in small concentrations, particularly ferrous ion in the form of ferrous ammonium sulfate at concentrations of a few parts of ferrous ion per million.

The amount of promoter required varies, as is known, with the free-radical initiator chosen and with the particular promoter. The emulsifying agent also affects somewhat the amount used as does the particular monomers. At the outside, not more than 3% nor less than 0.01% is used in these situations. The preferred range of ascorbic acid is at the low end of this range up to about 0.5% while sulfites are used preferably in an amount of 0.2 to 1%.

The temperature of polymerization is kept below about 85° C. and above about 10° C. and preferably in the range of 40 to 65° C. Control over the temperature can be exercised by regulating the rate of addition of the monomers or of the catalyst or by cooling or any combination of them. After the polymerization is essentially complete, the temperature is raised to about 85° C. to ensure the completeness of the reaction.

A convenient method of carrying out the polymerization utilizing the preceding principles comprises preparing separate premixtures as follows: (I) a catalyst-emulsifier premixture; (II) a first monomer premixture which contains from 5 to 60 weight percent of the monomers to be polymerized; (III) a second monomer premixture which contains the balance of the monomers to be polymerized. The first monomer premixture usually contains a mixture of both B monomer and C monomer and may contain some A monomer. Usually all or most of the A monomer is included in the second monomer premixture since the amino group of the A monomer has an inhibiting effect on the start of the emulsion polymerization resulting in a longer induction period. In those cases where in excess of 50% of the B monomer is a monovinyl aromatic, it is desirable to add at least part of the monovinyl aromatic in a third monomer premixture in order to get a copolymer having the proper film forming properties.

In this method of performing the reaction, the catalyst-emulsifier premixture is preferably prepared in hot water (40–85° C.). To this, the first monomer premixture is added and the polymerization is initiated. After the reaction becomes exothermic (immediately after the reaction temperature starts to rise or after this reaction is complete), the second monomer premixture is added over a period of time sufficient to permit the temperature to be controlled throughout the reaction. Additional catalyst and/or promoter being added when necessary to maintain the reaction. Finally, the reaction is permitted to go to completion, which is ensured by raising the temperature to about 85° C. If a third monomer premixture is employed, all of the premixture is added after the polymerization of the first two monomer premixtures is completed and additional catalyst and/or promoter is then added.

The resulting emulsion copolymer can then be adjusted to a pH of from about 7 to 10 with a volatile alkali, such as ammonia or morpholine. The copolymers can be shipped in either form, neutralized or not to a floor polish formulator or formulated with the other ingredients of the floor polish immediately after the copolymerization.

The floor polish of this invention is an aqueous composition containing an addition polymer of an ethylenically unsaturated aminoalkyl compound having an average particle size of from about 0.005 to 0.1 micron and a suitable wax, such as carnauba, candelilla, Fischer-Tropsch wax, oxidized polyethylene, polyethylene emulsions, modified Montan wax or ester wax, mixtures of rosin amine in polyethylene emulsion, copolymers of ethylene with various acrylate esters, etc. Both the wax and addition polymer contribute to the soap and water and alkali resistance of the applied polish. However, as pointed out above the primary function of the polymer component is to make the dried polish not only resistant to soap and water, but also capable of removal with materials which do not have a deleterious effect on the flooring material. In addition to the removability characteristics of this polymer, it must, of course, provide durability and gloss. On the other hand, the primary functions of the wax is to impart certain necessary film characteristics of a polish, mar resistance, buffability, flexibility, etc.

The characteristics of a dried film of the floor polish are improved by various other additives: alkali soluble resins, such as shellac, styrene-maleic anhydride resin and phenol-formaldehyde resin, serve as leveling aids as well as improving the gloss and mar resistance of the polish; nonionic polymers, such as ethyl acrylate-methyl methacrylate copolymers confer special characteristics such as resistance to heel marking and serve also as plasticizers, as well as contributing to the gloss, mar resistance and alkali resistance of the polish; carbitol and/or tributoxyethyl phosphate, act as leveling aids and softeners; fluorinated compounds of U.S. Patent 2,937,098 such as FC 134 sold by Minnesota Mining and Manufacturing Company, serve as leveling aids, etc.

The various components of the floor polish of this invention are preferably compounded within the following dry weight percentages, the total being 100%.

| Ingredient: | Percent |
|---|---|
| (a) Aminoalkyl copolymer | 50–85 |
| (b) Wax | 5–40 |
| (c) Alkali soluble resin | 0–12 |
| (d) Special purpose nonionic polymers | 0–20 |

While the above dry weight percentages can be varied somewhat, the concentrations of the various components must be closely controlled in order to form a balanced floor polish suitable for a wide range of flooring materials or for individual types of flooring material. For example, when component (a) comprises less than 50 dry weight percent of the floor polish, the applied floor polish is alkali-sensitive and not resistant to soap and water. On the other hand, if component (a) comprises more than 85 dry weight percent of the floor polish, the floor polish does not level out into a continuous coating, tends to be hazy and in general lacks the characteristics expected of a floor polish. As the concentration of component (b) increases from 5 to 40 dry weight percent of the floor polish, the buffability of the floor polish increases. Component (c), the alkali-soluble resin is desirably used to impart additional gloss and to assist in leveling, but more than 12% of this component causes the polish to lose its alkali resistance. Accordingly, on washing with soap and water, the flooring loses its gloss and luster as it dissolves partially or completely in soap and water.

The preceding ingredients are formulated in water at about 8–20% by weight total solids concentration with the aid of a non-ionic surface active agent, such as one of the type which is suitable for preparing the aminoalkyl copolymer. The floor polish is then adjusted to a pH of about 8 to 10 with a volatile alkali such as ammonia or morpholine. Leveling aids, such as Carbitol, tributoxyethyl phosphate or fluorocarbons, may be added in a total concentration of from about 0 to 4% by weight of the total wet weight of the polish. It is rarely advisable to use these leveling aids in a greater concentration because of their softening effect on the polish composition and/or cost.

As pointed out above an important feature of this invention is the provision of a floor polish remover for the described floor polish formulations which has no deleterious effect on flooring. The dried floor polish formulations of this invention can be removed from resilient tile and linoleum floors with an aqueous remover containing from about 1 to 5 percent by weight of an acid and from about 1 to 5 percent by weight of a water-soluble organic polar solvent. Unfortunately, this remover formulation has a dissolving and/or dulling effect on the linoleum or tile floor. The deterioration of the flooring is cumulative in that even where there is no visible evidence of deterioration, subsequent applications of a new coat of polish becomes progressively more difficult since the polish does not level properly on floors which have had several treatments with this cleaner. To avoid this, we have found, the applied floor wax formulations of this invention can be removed with the same acid-polar solvent cleaner, if it is buffered at a pH of from about 6.0 to 7.0 with a small but effective quantity of a water-soluble basic salt of a weak acid. At pH 6.5, the remover functions rapidly without any deleterious effect on the flooring while at a pH of about 7.0, the removal is slow and at a pH of about 6.0 there is a slight discoloration of the substrate. The cleaning composition is therefore an aqueous solution containing from 1 to 5% by weight of an acid, from 1 to 5% by weight of an organic polar solvent and sufficient salt to buffer the solution at a pH in the range of 6 to 7.

Citric acid, lactic acid, tartaric acid, glycolic acid, hydrochloric acid, acetic acid, gluconic acid, sulfamic acid, phosphoric acid, and benzene sulfonic acid are representative of the various acids which can be used in the cleaner. We have found that the hydroxycarboxylic acids are the most effective. Further, the hydroxycarboxylic acids are nontoxic and much less corrosive than the mineral acids. The difference in corrosiveness is particularly important since the cleaner may be marketed in a concentrated form to which water must be added and may come into contact with metal furniture.

Propanol, butoxyethanol and butoxyethyl propanol are representative of the various water-soluble polar organic alcohols which may be employed in this invention. The polar organic solvent and the acid may be formulated in a weight ratio of from 1:5 to 5:1.

The following compounds are representative of the various water-soluble basic salts of weak acids that can be employed in this invention: sodium carbonate, potassium carbonate, borax, barium acetate, calcium acetate, tetramethylammonium acetate, sodium acetate, disodium phosphate, trisodium phosphate, etc. The disodium and trisodium phosphates are basic salts of the weak acid monosodium phosphate for the purpose of this invention and the group $NaPO_4^=$ is accordingly viewed as the anion moiety of a weak acid.

The water-soluble salt is included in the mixture of acid and the water-soluble polar organic solvent at a concentration sufficient to give an aqueous solution (from 10 to 49 parts of water per part of active ingredient) containing from about 2 to 10 weight percent combined acid and polar organic solvent a pH of from about 6.0 to 7. The concentration of water-soluble salt necessary for any particular formulation of water, acid and organic polar solvent can accordingly be determined routinely using a pH meter. Having arrived at the exact concentration necessary for the desired formulation, the acid, organic polar solvent and water-soluble salt can be formulated with or without the presence of water. This composition is then ready for dilution by the user wishing to remove the floor polish of this invention.

In summation, the elements of this invention, the new floor polish and floor polish remover of this invention, combine in a new process for treating and preserving flooring materials, which comprises applying a floor polish comprising water and an addition, emulsion polymer of an ethylenically unsaturated aminoalkyl compound having an average particle size no greater than 0.1 micron, wherein said addition polymer comprises from about 50 to 85 dry weight percent of the floor polish, permitting said floor polish to dry and, after a period of wear, removing said floor polish with an aqueous remover comprising from 1 to 5% by weight of an acid, from 1 to 5% by weight of a water-soluble organic polar solvent and sufficient water-soluble basic salt of a weak acid to buffer said cleaner at a pH of from 6.0 to 7 and then reapplying said floor polish.

The following examples are merely illustrative and should not be construed as limiting the scope of this invention. In the example, the word "parts" refers to parts by weight.

*Example I*

The following premixtures were prepared to be used in the preparation of a preferred aminoalkyl floor polish polymer:

| Catalyst-emulsifier premixture: | Parts |
|---|---|
| Aerosol 22 | [1] 11.5 |
| (65% by weight water) | |
| Igepal CO–887 (30% by weight water) | [2] 20.0 |
| (A nonylphenoxypolyoxyethylene alcohol) | |
| Igepal CO–630 | 4.0 |
| (A nonylphenoxypolyoxyethylene alcohol) | |
| Tertiary butyl hydroperoxide | 2.5 |
| Water | 720 |

Catalyst-emulsifier premixture:
First monomer premixture: Parts
    Ethyl acrylate _____ 30
    Methyl methacrylate _____ 30
    Styrene _____ 20
Second monomer premixture:
    Ethyl acrylate _____ 85
    Methyl methacrylate _____ 75
    Styrene _____ 50
    Dimethylaminoethyl methacrylate _____ 40
Third monomer premixture:
    Styrene _____ 70
Promoter:
    Ascorbic acid _____ 0.5

[1] 4.0 parts emulsifier.
[2] 14.0 parts emulsifier.

The emulsifier-catalyst premixture was prepared in hot water (75° C.) in a suitable glass-lined reactor fitted with a stirrer and jacket. After the first monomer premixture was added to the emulsifier-catalyst premixture and the reactor was adjusted to 40° C., the promoter (in aqueous solution) was added to the reactor. After the first few minutes, the temperature began to rise. When it reached 45° C. the addition of the second monomer premixture was begun. The temperature was allowed to rise to 60° C. and held there with cooling for an additional 30 minutes after the addition of the second monomer premixture was complete. All of the third monomer premixture was added at once and the temperature was allowed to rise to 85° C. in order to complete the polymerization. The emulsion was then cooled to room temperature and neutralized with ammonia to a pH of 8.

*Example II*

This example illustrates the preparation of a floor polish from the copolymer of Example I. A polyethylene emulsion was prepared by melting 100 parts of polyethylene and 17.5 parts of oleic acid together at a temperature of 230–240° F. After 12.5 parts morpholine was stirred into the melt, the melt was added at a steady rate to 520 parts of water which had been heated to 205° F. Twenty parts (dry weight) of this polyethylene emulsion was added to 80 parts (dry basis) of the emulsion polymer of Example I followed by dilution with water to 14% by weight total solids. The emulsion was adjusted to a pH of 9 with ammonia and then 0.5 part KP–140 (tributoxyethyl phosphate) was added with stirring.

This floor polish was applied to several rubber tile and allowed to dry. The removability of the floor polish with various liquids was then tested on a Standard Gardner Straight Line Washability machine. This test involves placing the test tile under a mechanically oscillating brush in contact with the test liquid and noting the condition of the tile after a predetermined number of oscillations. The results are recorded below:

| Test Liquid | Number of Oscillations | Results |
| --- | --- | --- |
| Water | 175 | No effect. |
| 2% solution of potassium oleate | 175 | Do. |
| 5% solution of Spic & Span | 175 | Do. |
| Special Cleaner [1] | 20–40 | Polish completely removed. |

[1] The special cleaner was a composition comprising 25 parts of 5% by weight aqueous solution of disodium phosphate, 25 parts of 2% by weight aqueous solution of citric acid and 2 parts butoxyethoxypropanol diluted with sufficient water to make 100 ml. The cleaner had a pH of 6.5.

The above table illustrates that the floor polish of this invention has the desired combination of properties, namely soap and water resistance and good removability with mildly acidic materials.

*Example III*

Example I was repeated except that dimethylaminoethyl methacrylate was replaced by the same amount of tert-butylaminoethyl methacrylate. A floor polish was formulated by adding 15 parts (dry weight) of the polyethylene emulsion described in Example II to 65 parts (dry weight) of the tert-butylaminoethyl methacrylate emulsion copolymer. Ten parts (dry weight) of an ammonia cut alkali soluble resin sold under the name Shanco L–1090 (believed to be a terpenephenolic resin), which was prepared by adding 100 parts of Shanco L–1090 to a composition comprising 20 parts 26° Bé.-ammonia and 594 parts water at 170–175° F., was added to the above emulsion. After 10 parts (dry weight) of a nonionic emulsion copolymer of ethyl acrylate and methyl methacrylate was added to the floor polish, it was diluted with water to 14% by weight total solids and adjusted to a pH of 9 and 26° Bé.-ammonia. Five-tenths parts of KP140 was then added to 100 wet parts of the floor polish. This polish was applied to several rubber tile and tested on a Standard Gardner Straight Line Washability machine as described in Example II with essentially the same results.

*Example IV*

Example I was repeated except that the dimethylaminoethyl methacrylate was replaced by the same amount of dimethylaminoethyl acrylate. A floor polish was formulated by adding sequentially 15 parts (dry weight) of the polyethylene emulsion described in Example II, 10 parts (dry weight) of the ammonia cut alkali-soluble resin described in Example III and 10 parts (dry weight) of a polystyrene latex to 65 parts (dry weight) of the dimethylaminoethyl acrylate copolymer. After the floor polish was diluted to 15% by weight total solids with water and adjusted to a pH of 9.5 with 26° Bé.-ammonia, 0.5 part KP140 and 1 part carbitol were added to 100 wet parts of polish. This polish was applied to several rubber tile and tested on a Standard Gardner Straight Line Washability machine as described in Example II with essentially the same results.

*Example V*

The following premixtures were prepared to be used in the preparation of another aminoalkyl floor polish polymer:

Catalyst emulsifier premixture: Parts
    Atlas G263 (65% by weight water) _____ [1] 15
    Tergitol NPX (an alkylphenyl ether of polyethylene glycol) _____ 4
    Tertiary butyl hydroperoxide _____ 1
    Water _____ 350
First monomer premixture:
    2-ethylhexyl acrylate _____ 12.5
    Acrylonitrile _____ 12
    Styrene _____ 6
    Methyl methacrylate _____ 17
    Dimethylaminoethyl methacrylate _____ 2.5
Second monomer premixture:
    2-ethylhexyl acrylate _____ 37.5
    Acrylonitrile _____ 36
    Methyl methacrylate _____ 51
    Styrene _____ 18
    Dimethylaminoethyl methacrylate _____ 7.5
Promoter:
    Ascorbic acid _____ 0.2

[1] 5.25 parts emulsifier.

The emulsifier-catalyst premixture was prepared in hot water (75° C.) in a suitable glass-lined reactor fitted with a stirrer and jacket. After the first monomer premixture was added to the emulsifier-catalyst premixture, the pH of the reactants was adjusted to 2.5 with concentrated hydrochloric acid and the temperature of the reactor was adjusted to 35° C. The promoter (in aqueous solution) was added to the reactor and after the temperature began to rise, the addition of the second monomer premixture was begun. The temperature was allowed to rise to 60° C. and held there with cooling for an additional 30 minutes after the addition of the second monomer premixture was complete. The temperature of the reaction was then adjusted to 80° C. in order to complete the polymerization.

A floor polish was formulated and tested in the same manner as in Example II except that the dimethylaminoethyl methacrylate copolymer used in Example II was replaced by the dimethylaminoethyl methacrylate copolymer of this example with essentially the same results. Three similar copolymers and floor polishes were prepared by replacing the dimethylaminoethyl methacrylate of this example with ten parts by weight of tert-butylaminoethyl methacrylate, ten parts by weight of dimethylaminoethyl acrylate and ten parts by weight of diethylaminoethyl acrylate.

*Example VI*

The following premixtures were prepared to be used in the preparation of another aminoalkyl floor polish polymer:

Catalyst-emulsifier premixture: Parts
    Igepal CO–887 (30% by weight water) _____ [1] 40
    Igepal CO–630 _____ 8
    Tertiary butyl hydroperoxide _____ 2.5
    Water _____ 720
First monomer premixture:
    Methyl methacrylate _____ 120
    Styrene _____ 100
    Dodecynyl succinic anhydride _____ 15
Second monomer premixture:
    Ethyl acrylate _____ 100
    Methyl methacrylate _____ 40
    Styrene _____ 30
    Dimethylaminoethyl methacrylate _____ 30
Promoter:
    Ascorbic acid _____ 0.5

[1] 28 parts emulsifier.

The emulsifier-catalyst premixture was prepared in hot water (75° C.) in a suitable glass-lined reactor fitted with a stirrer and jacket. After the first monomer premixture was added to the emulsifier-catalyst premixture, 0.3 gram of promoter was added to the reactor. The temperature of the exothermic reaction was allowed to rise to 65° C. and held there with cooling until the polymerization was completed and then cooled to 30° C. After the second monomer premixture was added to the reactor, the remainder of the promoter was added. The temperature was allowed to rise to 65° C. and held there with cooling and then heating until the polymerization was complete.

A floor polish was formulated and tested in the same manner as in Example II except that the dimethylaminoethyl methacrylate copolymer used in Example II was replaced by the dimethylaminoethyl methacryalte copolymer of this example with essentially the same results.

The dimethylaminoethyl methacrylate can be replaced with one or more of the aminoalkyl monomers used in the preceding examples.

*Example VII*

The following premixtures were prepared to be used in the preparation of another aminoalkyl floor polish polymer:

Catalyst-emulsifier premixture: Parts
    Aerosol 22 (65% by weight water) _____ 11.5
    Igepal CO–887 (30% by weight water) _____ 20.0
    Igepal CO–630 _____ 4.0
    Tertiary butyl hydroperoxide _____ 2.5
    Water _____ 720
First monomer premixture:
    2-ethylhexyl acrylate _____ 7.5
    Styrene _____ 17.5
    Ethyl acrylate _____ 17.5
    Methyl methacrylate _____ 30
    Tert-butylaminoethyl methacrylate _____ 10
Second monomer premixture:
    2-ethylhexyl acrylate _____ 22.5
    Styrene _____ 52.5
    Ethyl acrylate _____ 52.5
    Methyl methacrylate _____ 90
    Tert-butylaminoethyl methacrylate _____ 30
Third monomer premixture:
    Styrene _____ 70
Promoter:
    Ascorbic acid _____ 0.5

The emulsifier-catalyst premixture was prepared in hot water (75° C.) in a suitable glass-lined reactor fitted with a stirrer and jacket. After the first monomer premixture was added to the emulsifier-catalyst premixture and the reactor was adjusted to 20° C., the promoter (in aqueous solution) was added to the reactor. After the first few minutes the temperature began to rise. When it reached 30° C. the addition of the second monomer premixture was begun. The temperature was allowed to rise to between 60 and 65° C. and held there with cooling for an additional 30 minutes after the addition of the second monomer premixture was complete. All of the third monomer premixture was added at once and the temperature was allowed to rise to 80° C. in order to complete the polymerization.

A floor polish was formulated and tested in the same manner as in Example II except that the dimethylaminoethyl methacrylate copolymer used in Example II was replaced by the tert-butylaminoethyl methacrylate copolymer of this example.

*Example VIII*

The following premixtures were prepared to be used in the preparation of another aminoalkyl floor polish polymer:

Catalyst-emulsifier premixture: Parts
    Igepal CO–630 _____ 8
    Igepal CO–887 (30% by weight water) _____ 40
    Tertiary butyl hydroperoxide _____ 3
    Water _____ 720
First monomer premixture:
    Methyl methacrylate _____ 15
    Ethyl acrylate _____ 27
    Styrene _____ 12
Second monomer premixture:
    Methyl methacrylate _____ 85
    Ethyl acrylate _____ 153
    Styrene _____ 68
    Dimethylaminoethyl methacrylate _____ 40
Promoter:
    Ascorbic acid _____ 0.6

The emulsifier-catalyst premixture was prepared in hot water (75° C.) in a suitable glass-lined reactor fitted with a stirrer and jacket. After the first monomer premixture was added to the catalyst-emulsifier premixture and the reactor was adjusted to 40° C., the promoter was added to the reactor. After the first few minutes, the temperature began to rise. When it reached 45° C. the addition of the second monomer premixture was begun. The temperature was allowed to rise to 60° C. and held there with cooling for an additional hour after the addition of the second monomer premixture was complete.

A floor polish was formulated and tested in the same manner as in Example II except that the dimethylaminoethyl methacrylate copolymer used in Example II was replaced by the dimethylaminoethyl copolymer of this example.

*Example IX*

This example illustrates the importance of using a floor cleaner having a pH of from about 6.0 to 7.0 in order to remove the floor polish of this invention from resilient flooring. The floor polish of Example II was applied to several asphalt tiles and allowed to dry. Each of these tiles was cleaned in a Gardner Straight Line Washability machine using a cleaner having the following basic formulation:

| | |
|---|---|
| 2% aqueous solution of citric acid | 24 grams. |
| Butoxy ethoxy propanol | 2 grams. |
| Ethomeen C-12 (polyethylene coco amine) | 1 gram. |
| Igepal CO-610 (a nonylphenoxypoly-oxyethylene glycol) | 0.5 gram. |
| 5% solution of disodium phosphate | Sufficient to adjust pH. |
| Water | Sufficient to make 100 ml. |

The pH of these various cleaners increased as the amount of disodium phosphate buffer solution was increased.

| pH | Effect on Tile | Removal |
|---|---|---|
| 5.0 | Damage | Complete. |
| 5.5 | do | Do. |
| 6.0 | Slight damage | Do. |
| 6.5 | No damage | Do. |
| 7.0 | do | Partial. |

*Example X*

The floor polish of Example III was applied to an asphalt tile and dried. The floor polish was removed without any difficulty from the floor and without any damage to the substrate using a cleaner having the following composition: 25 grams of a 2% aqueous solution of tartaric acid, 25 grams of a 5% aqueous solution of disodium phosphate, 2 grams butoxyethoxy propanol and sufficient water to make 100 ml. The floor polish of Example III was then reapplied to the tile without any difficulty.

Since many embodiments may be made of this invention and since many changes may be made in the embodiments described, the foregoing is to be interpreted as illustrative only, and the invention is defined by the claims appended hereto.

We claim:
1. In a process for treating and preserving flooring materials, the improvement which comprises applying a floor polish comprising water, wax and an addition emulsion polymer containing from about 4 to 20 weight percent of an ethylenically unsaturated aminoalkyl compound, said polymer having an average particle size no greater than 0.1 micron, wherein said addition polymer comprises from about 50 to about 85 dry weight percent of the floor polish, permitting said floor polish to dry, and after a period of wear, removing said floor polish with an aqueous cleaner composition comprising from 1 to 5% by weight of an acid, from 1 to 5% by weight of a water-soluble organic polar solvent and sufficient water-soluble basic salt of a weak acid to buffer said cleaner at a pH of from 6 to 7, then reapplying said aqueous floor polish.

2. The process of claim 1, wherein said floor polish contains a wax in the proportion of from 5 to 40 dry weight percent of the floor polish.

3. The process of claim 2, wherein said emulsion polymer is the copolymerization product of from 40 to 80 weight percent of an ethylenically unsaturated hard monomer and from 20 to 60 weight percent of an ethylenically unsaturated soft monomer.

4. The process of claim 2, wherein said emulsion polymer is the copolymerization product of from 40 to 80 weight percent of an ethylenically unsaturated hard monomer and from 20 to 60 weight percent of an ethylenically unsaturated soft monomer, wherein from 4 to 20 weight percent of the ethylenically unsaturated monomers in the copolymerizate is an alkylaminoalkyl ester of an acid selected from the group consisting of acrylic acid and methacrylic acid.

5. The process of claim 4, wherein the ethylenically unsaturated hard monomer comprises at least one monomer selected from the group consisting of styrene, vinyl toluene, methyl methacrylate and acrylonitrile.

6. A method for cleaning to remove a dry layer of polish comprising wax and from 50 to 85 dry weight percent of an addition emulsion polymer containing from about 4 to 20 weight percent of an ethylenically unsaturated aminoalkyl compound, said method comprising applying to said layer an aqueous cleaner composition comprising from 1 to 5% by weight acid, from 1 to 5% by weight of a water-soluble polar solvent and sufficient water-soluble basic salt of a weak acid to buffer said cleaner at a pH of from 6 to 7.

7. A remover composition adapted to remove an applied floor polish containing about 50 to 85 weight percent of an addition polymer of an ethylenically unsaturated aminoalkyl compound, said remover comprising an acid and a water-soluble polar organic solvent in a weight ratio of from 1:5 to 5:1, and a sufficient quantity of a water-soluble basic salt of a weak acid to buffer an aqueous solution of said acid and water-soluble polar organic solvent at a pH of from about 6 to 7.

8. The composition of claim 7 wherein said organic polar solvent is an alcohol and said acid is a hydroxy carboxylic acid.

9. A remover composition adapted to remove an applied floor polish containing about 50 to 85 weight percent of an addition polymer of an ethylenically unsaturated aminoalkyl compound, said remover comprising an acid and a water-soluble polar organic solvent in a weight ratio of from 1:5 to 5:1, and a sufficient quantity of a water-soluble basic salt of a weak acid to buffer an aqueous solution of said acid and water-soluble polar organic solvent at a pH of from about 6 to 7, wherein the water which is necessary to form said aqueous solution comprises from about 10 to 49 parts for each part of the combined total of acid and water-soluble polar organic solvent.

References Cited by the Examiner

UNITED STATES PATENTS

| | | | |
|---|---|---|---|
| 2,327,495 | 8/1943 | Budner | 134—6 |
| 2,507,985 | 5/1950 | Kuentzel | 252—143 |
| 2,606,165 | 8/1952 | Chapin et al. | 260—28.5 |
| 2,695,277 | 11/1954 | Pabst et al. | 260—28.5 |
| 2,862,900 | 12/1958 | Bryant et al. | 260—28.5 |
| 2,908,590 | 10/1959 | Norris | 117—64 |
| 2,971,920 | 2/1961 | Wurmbock | 252—143 |
| 2,972,592 | 2/1961 | Brown et al. | 260—27 |
| 2,977,242 | 3/1961 | Lederman et al. | 117—64. |

WILLIAM D. MARTIN, *Primary Examiner.*

JULIUS GREENWALD, *Examiner.*

M. WEINBLATT, H. W. MYLIUS, *Assistant Examiners.*